(12) United States Patent
Jones et al.

(10) Patent No.: US 11,922,153 B2
(45) Date of Patent: Mar. 5, 2024

(54) PIPELINE MANAGER

(71) Applicant: Wind River Systems, Inc., Alameda, CA (US)

(72) Inventors: Matt Jones, Portland, OR (US); Salim Nasser, Alameda, CA (US); Jason Wessel, Alameda, CA (US)

(73) Assignee: WIND RIVER SYSTEMS, INC., Alameda, CA (US)

( * ) Notice: Subject to any disclaimer, the term of this patent is extended or adjusted under 35 U.S.C. 154(b) by 119 days.

(21) Appl. No.: 17/305,730

(22) Filed: Jul. 14, 2021

(65) Prior Publication Data
US 2023/0014438 A1    Jan. 19, 2023

(51) Int. Cl.
| | |
|---|---|
| G06F 8/41 | (2018.01) |
| G06F 8/65 | (2018.01) |
| G06F 8/77 | (2018.01) |
| G06F 9/46 | (2006.01) |

(52) U.S. Cl.
CPC .............. *G06F 8/4452* (2013.01); *G06F 8/65* (2013.01); *G06F 8/77* (2013.01); *G06F 9/463* (2013.01)

(58) Field of Classification Search
None
See application file for complete search history.

(56) References Cited

U.S. PATENT DOCUMENTS

| | | | |
|---|---|---|---|
| 9,021,467 B2* | 4/2015 | Choi ................... | H04B 1/0003 |
| | | | 717/177 |
| 9,405,866 B1* | 8/2016 | Cho ....................... | G06F 30/33 |
| 10,572,249 B2* | 2/2020 | Brebner .................. | G06F 8/73 |
| 11,074,107 B1* | 7/2021 | Nandakumar ........... | G06F 8/10 |
| 11,150,895 B1* | 10/2021 | Wall ......................... | G06F 8/65 |
| 11,526,524 B1* | 12/2022 | Saulys ..................... | G06F 8/34 |
| 11,544,050 B1* | 1/2023 | Ankit ....................... | G06F 8/65 |
| 11,586,433 B2* | 2/2023 | Hoenzsch ................. | G06F 8/60 |
| 2019/0303623 A1* | 10/2019 | Reddy ....................... | G06F 8/71 |
| 2021/0342136 A1* | 11/2021 | Harkare .................... | G06F 8/77 |

* cited by examiner

*Primary Examiner* — Marina Lee
(74) *Attorney, Agent, or Firm* — Fay Kaplun & Marcin, LLP

(57) ABSTRACT

The exemplary embodiments are related to a pipeline manager configured to manage a software development pipeline. The pipeline manager receives, via a user interface (UI), a representation of a pipeline comprising a plurality of blocks, wherein each block comprises a defined input and a defined output, executes each block of the pipeline, validates output of each block of the pipeline based on the execution of the block and stores the output of each block and updating data that defines the pipeline based on the output of each block.

20 Claims, 5 Drawing Sheets

PIPELINE MANAGER

BACKGROUND INFORMATION

A pipeline is a set of processes that allow developers to compile, build, and deploy code to computing platform. Traditional pipelines are manually composed and encoded pipelines making it hard and time consuming to create, modify and debug the pipeline. In addition, any new tools need to be manually added which leads to delays waiting for integration. Moreover, traditional pipelines have limited graphical interfaces making it hard to visualize the system and the progress of a system. Traditional pipelines are also wasteful in terms of computing resources because any changes require complete re-runs with limited cache sharing and multiple custom pipelines are required to perform testing of two similar platforms that share the same application code. Furthermore, traditional pipelines do not have options for multi-user administration, e.g., there is no mechanism for one person to edit one component of the pipeline while another person is running the pipeline. A system is needed to solve these and other problems with the traditional pipelines.

SUMMARY

Some exemplary embodiments are related to a method including receiving, via a user interface (UI), a representation of a pipeline comprising a plurality of blocks, wherein each block comprises a defined input and a defined output, executing each block of the pipeline, validating output of each block of the pipeline based on the execution of the block and storing the output of each block and updating data that defines the pipeline based on the output of each block.

Other exemplary embodiments are related to a non-transitory computer readable storage medium including a set of instructions configured to be executed by a processor. The set of instructions cause the processor to perform operations including receiving, via a user interface (UI), a representation of a pipeline comprising a plurality of blocks, wherein each block comprises a defined input and a defined output, executing each block of the pipeline, validating output of each block of the pipeline based on the execution of the block and storing the output of each block and updating data that defines the pipeline based on the output of each block.

DETAILED DESCRIPTION

Figure 1:
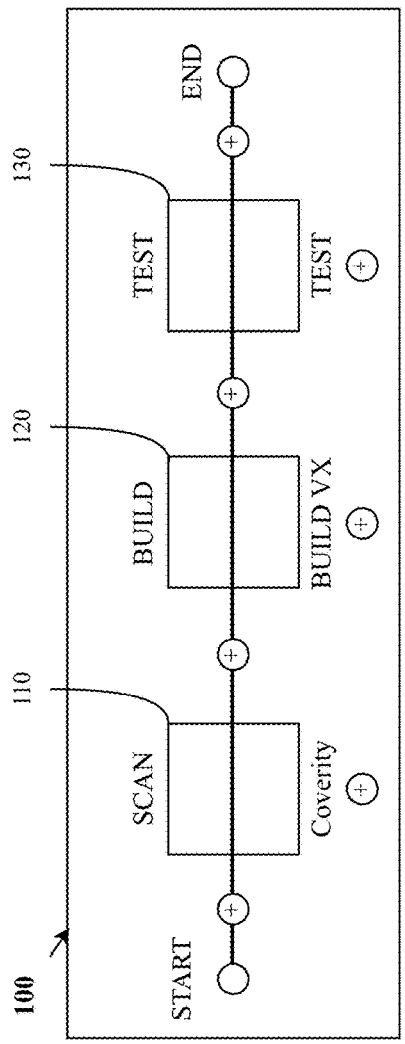
FIG. 1 shows a simple example of a Pipeline according to various exemplary embodiments.

The exemplary embodiments may be further understood with reference to the following description and the related appended drawings, wherein like elements are provided with the same reference numerals. The exemplary embodiments are related to a device, a system, and a method for implementing a pipeline manager that is configured to define, monitor and execute complex pipelines and workflows, utilizing tools and integration points.

The present disclosure relates to a pipeline manager that is a combination tool that allows a user to rapidly combine reusable building blocks of data from a library of building blocks into a build, test and deploy pipeline. The pipeline manager allows a user to utilize the results of previous blocks as inputs to other blocks. The pluggability of the reusable blocks in this format also allows the user to predict the input and output of future blocks, while also providing the user with a tool to easily add specific and proprietary tools to new and existing pipelines. Thus, the pipeline manager avoids the need for scripts when reconfiguring, while streamlining and simplifying the reconfiguration and integration process.

The pipeline manager automates the recreation of the pipeline and automatically error checks the pipeline making it easy to create, modify and debug the code base. The pipeline manager includes a graphical user interface (GUI) with Representational State Transfer (REST) Application Programming Interfaces (APIs), running in a browser. This allows for a simple visualization of the pipeline and simple creation and modification of the pipeline using the GUI.

The pipeline manager allows a single pipeline run to build an application for one or more platforms that may automatically be consumed by the proper test harness. As will be described in greater detail below, the automatic selection is possible by checking the outputs of the build phase and connecting it to the correct data types of the test block. In this manner, a single test block may test multiple platforms or multiple test blocks which specifically test a single platform.

The pipeline manager has intelligent cache sharing to be able to re-use assets from any of the previous runs (on any pipeline). The pipeline manager uses incremental hashes of the inputs and outputs of each stage to so that stage output cache may be shared with different pipelines of the same permission level.

The pipeline manager also allows user and role based permissions, on a block by block, or pipeline by pipeline basis to allow different users to simultaneously access a pipeline.

Throughout this disclosure, a pipeline refers to the overall unit of action in the pipeline manager. Pipelines are made up of blocks, which are individual atoms of work. According to various exemplary embodiments, there are three distinct components of the overall solution for executing pipelines: the pipeline manager, the pipeline executor and the pipeline definition.

Throughout this disclosure, pipeline definition refers to all data necessary to evaluate a pipeline. The data may include, for example, execution state, block type definitions, etc. In the exemplary embodiments, this data may be stored in a SQL database and is considered to be a part of the pipeline definition. However, there is no requirement that the pipeline definition be stored in SQL, as other storage mechanisms may also be used, e.g., non-SQL databases, data arrays, etc. In further examples, the pipelines may be described using YAML or JSON, and as such, pipeline definitions may be stored in other non-SQL data stores.

Throughout this disclosure, the pipeline manager refers to the parts of the solution that the user interacts with to create, edit, run, monitor and report on their pipelines and executions. According to various exemplary embodiments, the pipeline manager is a web stack in a larger integrated development environment (IDE) that may include both new and existing microservices. An action block refers to a type of block whose functionality is handled purely within the IDE and is not reliant on integrated or third party tools to run.

Throughout this disclosure, the pipeline executor refers to the component which, given a valid pipeline definition, attempts to evaluate the pipeline, performing each stage, validating input and output, aggregating results and adding post-run elements. In some exemplary embodiments, the pipeline executor is a library that may be hosted in a microservice within the pipeline manager.

Throughout this disclosure, a block refers to the building block of a pipeline, which is an individual atom of work which has inputs and outputs and performs an action within the IDE. Block configuration refers to the user-provided values that are used to supply inputs to blocks. In some exemplary embodiments, the output from a previous block is used to supply the input to a block. Block execution refers to an instance of a block's execution within a pipeline. In some exemplary embodiments, there may also be an equivalent object for the overall pipeline.

A block type refers to the schema and other necessary metadata for the pipeline executor to determine what action a particular block represents. A block type handler refers to the block type that is used to determine which handler should be invoked to evaluate a block. A handler refers to the specific TypeScript code that performs the necessary actions for the block type to execute. Handlers are atomic functions that have inputs and outputs defined by their block type's schema. In some exemplary embodiments, a handler that has successfully initiated work may return a run context, which refers to an arbitrary JSON object that contains enough information for the handler (which is stateless) to know which instance of a running block is being addressed.

A block input refers to block type schemas defined inputs, including types. These inputs are used to initiate block execution. Input values may be provided as block configurations, or as property references to previous outputs from earlier stages or areas of the execution state. A block output refers to block type schemas defining a particular set of outputs, including their types. Blocks are then responsible for producing these outputs that may be stored in a global execution state and may remain available as artifacts as the pipeline is run. In some exemplary embodiments, the actual output produced by a block may be metadata about the physical output of the job the block performed. For example, the output in this context may not be the built image, but a location of the image in the artifact repository.

Execution refers to a particular instance of a pipeline's execution. Execution can be used to obtain information, including but not limited to block results and overall pipeline status. Execution state refers to when, as a pipeline is executed, the inputs and outputs of each block within the pipeline are aggregated into a global execution state, which can be referenced by future blocks, or used as a pipeline artifact later. Execution State Store ("ESS") refers to a data storage location (e.g., a non-SQL data store) that can be used to store the execution state.

Throughout this disclosure, integration block refers to a type of block whose functionality is mostly handled by an integrated tool or third-party tool.

FIG. 1 illustrates a simple example of a pipeline 100 according to various exemplary embodiments. This example shows a view of the pipeline 100 as may be displayed in the GUI of the pipeline manager. The GUI may be executed in a browser. The GUI allows for a simple and coherent graphical overview of the pipeline 100. It also allows for the simple creation and editing of the pipeline 100. Each of the blocks 110-130 of the pipeline 100 may be dragged and dropped into the correct location using the GUI. In addition, as illustrated in FIG. 1 by the "+" signs, additional blocks may be added to the pipeline by a simple user interaction with the GUI. In this example, Coverity 110, BUILD VX 120 and Test 130 in FIG. 1 are all blocks. For example, the Coverity 110 block may be considered to be an integration block as described above. The BUILD VX 120 block may be considered to be a build block for the Wind River Vx Works environment. The test 130 block may be considered to be the tests that are run on the Vx Works build.

Those skilled in the art will understand that these blocks are only exemplary and may other serial and/or parallel blocks may be added to the pipeline 100. For example, a parallel build block for Linux may also be inserted into the pipeline 100. When the pipeline 100 is executed, blocks are run from left to right (series). In an exemplary embodiment, blocks stacked atop each other occur within the same stage (parallel). According to some exemplary embodiments, blocks within a stage may be run concurrently, meaning that no block in a stage can consume the output of a block in the same stage.

In this embodiment, the blocks refer to instances of a particular block type, or in other words, the "base class" of the block. A block type may be specific, e.g., used for only a single type of block, or more generic, e.g., reused for multiple types of block. In some exemplary embodiments, a third-party integration is likely to be a one-off block type, whereas build and test blocks may be instances of more generic block types.

A block type may be comprised of a block type handler, a schema, and a block type stage. A block type handler is used by the pipeline executor to determine which particular handler should be used to run the block. For one-off blocks this may be a specific handler written to dispatch that particular block. Other block types may use generic handlers as described above. A schema refers to objects which define the block type's inputs and outputs. For example, a schema may be a JSON model that defines the input parameters and configuration necessary to run the block, and the outputs that the block will generate. A block type stage is used by the user interface (UI) to determine in which stage(s) a particular block type can be used.

Pipelines are broken up into stages (e.g., the columns in the UI), which are discrete phases that may be evaluated asynchronously. Blocks within a stage cannot depend on the actions or outputs of other blocks within the same stage. In some examples, a stage enables basic concurrency for minimum viable product ("MVP") and early releases. However, more complex functionality may be added for depending on the stage of the development.

Blocks have defined inputs and outputs, including their types, in the schema for the block type. Block type handlers have a similar relationship to block types as block types have to blocks, e.g., there can be a one-off block type handler which can perform very specific functions, as well as more generic block type handlers (e.g., Jenkins Jobs) that may be used for a variety of different tasks.

In some embodiments, blocks and pipelines may be signed, or in other words, fully versioned with discrete changes that are tracked individually. The results of a particular execution of a pipeline may be stored in the database as executions. An execution correlates with a single run of a pipeline and contains block executions that are records of the individual blocks' executions, including but not limited to their status.

The output of every block may be modeled, which allows for the connection of the output of one block to the input of another. This feature is beneficial because it avoids conspiracies, while also making the blocks reusable. Another positive effect of this feature is that it results in a flexible pipeline that can be manually built at a faster rate and be maintained in a variety of manners. For example, if a user is building code in Linux and wanted to change to VX Works, the user does not have to edit the code in several different places to do this. Additionally, this structure allows the user to test, for example, both Linux and VX Works independently, even if they are unrelated, without the need to make two separate pipelines. Thus, the pipeline manager allows a single pipeline run to build an application for one or more platforms. The pipeline will automatically be consumed by the proper test harness (e.g., Vx Works, Linux, etc.). The automatic selection is possible by checking the outputs of the build phase and connecting it to the correct data types of the test block. It is also possible to have a single test block which tests multiple platforms or multiple test blocks which specifically test a single platform.

The intelligent inputs and outputs may be signed on each side. This allows the pipeline to intelligently predict the output based on the input, using signatures and hash equivalency. For example, if the input is going to be the same as a prior pipeline run, it can reliably be predicted that the output will also be the same as the prior run. Thus, if there is no change since the last time the pipeline ran or no change in the signature, it can be predicted that the input is the same, so the tests and output are the same, allowing the run to skip to the results stage. Moreover, because the pipeline manager uses incremental hashes of the inputs and outputs of each stage, the stage output cache may be shared with different pipelines of the same permission level. The permission levels will be described in greater detail below.

In some exemplary embodiments, there may be two distinct data stores that are used by the pipeline executor, a Postgres SQL database containing pipeline definitions and a non-SQL database storing execution states for pipeline runs (active and past). The latter is also referred to as the ESS, as described above.

The overall execution state of a particular pipeline may be tracked on a per-block level. According to these exemplary embodiments, each block's inputs and outputs may be stored in a paged non-SQL database allowing for detailed analysis, troubleshooting, reporting and logging of pipeline events. Wiring of outputs-to-inputs may be accomplished by way of property references, which are essentially string-based merge tags that can reference parts of the global pipeline configuration or the execution state of the current execution, e.g., a property reference is a mechanism that allows values from the execution state to be used as inputs for blocks.

As should be understood from the above, the creating of tools as blocks allows new tools to be created as a single block. The block may then be inserted into existing pipelines or new pipelines without having to re-create the tool for each individual pipeline. This single creation of a tool saves time and allows a consistent tool to be inserted into each desired pipeline.

The pipeline manager also allows for user and role based permissions, on a block by block, or pipeline by pipeline basis. These permission levels allow for multi-user administration, e.g., one person editing a piece of the pipeline and another running the pipeline. The security permissions and required roles to run each block may vary. In addition, a user who is entitled to run the pipeline may not be able to view logs or some blocks. The permissions also allow block outputs to be marked as copy-only separate of the logs and inputs by certain users so as to protect sensitive input content from being exposed. As described above, different pipelines may share the cache result of other cached block sequences if the sequence is the same and the permissions are compatible between the pipelines. The completion of the pipeline may result in the generation of a pipeline execute birth certificate that is signed and UTC time stamped which can be used for complete traceability to the origin of the code and results.

Figure 2:
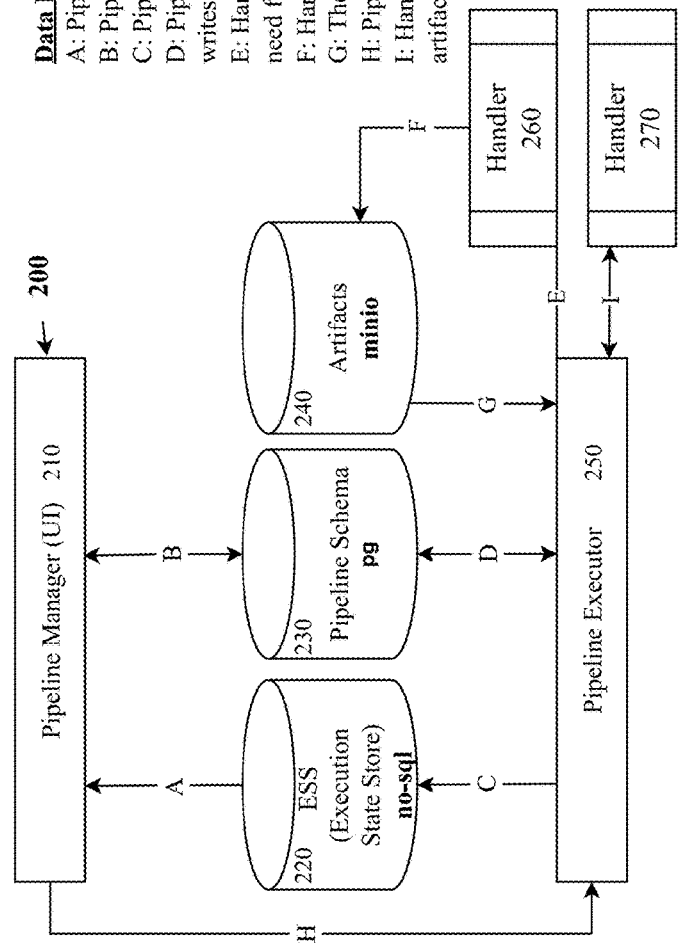
FIG. 2 illustrates a first exemplary data flow and service calls between the two main components of the overall solution according to various exemplary embodiments.

FIG. 2 shows a first exemplary data flow and service calls between the main components 200 of the overall solution according to various exemplary embodiments. The data flow may include the pipeline manager reading and displaying information from the ESS 220 (A) and the SQL database 230 (B). The pipeline manager UI 210 ("GUI", "UI", or "pipeline manager," may be used interchangeably herein) reads from both the ESS 220 and the SQL database 230 to function. As described above, detailed information about previous runs, such as the execution state at various stages of the pipeline is read from the ESS 220, while details about specific pipelines and high-level details about previous runs, including but not limited to pass/fail, timestamps, etc., come from SQL database 230.

One of the pipeline manager's primary functions is to build the pipeline, the entirety of which may be stored in the SQL database 230. Everything from the structure of the blocks in the pipeline, to the pipeline and block configuration to the wiring between blocks may be represented in the SQL database 230. The pipeline manager 210 may not write to the ESS 220. However, the UI 210 may read from artifacts to display particular build outputs may link to artifacts in an object storage server 240 (e.g., MinIO). The UI 210 calls into the pipeline executor 250, which may be hosted as a microservice within the pipeline manager web stack, to request a pipeline run (H).

The pipeline executor 250 writes execution states to the ESS 220 (C). Further, the pipeline executor 250 reads pipeline definitions from the SQL database 230 and writes executions and block executions. More specifically, a pipeline's lifecycle within the pipeline executor 250 begins with the definitions being loaded from the SQL database 230 (D). Validations may be performed on the initial stage of blocks to ensure they are supplied with a configuration so that the blocks can run.

After validation, the pipeline executor 250 supplies the necessary inputs to the handler(s) 260, 270 for the particular block or blocks that are running (E). Handlers 260, 270 may not be aware of the databases and they receive necessary information from the pipeline executor 250. In other words, handlers 260, 270 are not responsible for loading their own information from databases. In some exemplary embodiments, the handlers 260, 270 have no direct access to the SQL database 230 pipeline schema or the ESS 220.

Handlers 260, 270 may then store their results in artifacts 240 (F), in a location defined by a pipeline configuration and passed from the pipeline executor 250. This mechanism may be used for third party tools to pass their output back to the pipeline executor 250. Blocks 260, 270 that have content that is completely handled within the IDE can simply return their output (I) directly to the pipeline executor 250. When a block completes, the pipeline executor 250 will load the output, either from memory or from artifacts 240 (G), store it in the ESS 220 (C), and update the SQL database 230 (D) by creating a new block execution and updating the execution.

The general lifecycle of a block within the pipeline may be as follows. The block lifecycle begins when the block is determined to be "ready to run" by the pipeline executor 250, which means that the preceding stage has been run, or alternatively in the case of the first block in a pipeline, that a run has been requested. If the pipeline is well-formed, this will provide the necessary outputs from the previous steps, as well as ensuring that things happen in the correct sequence, but as performantly as possible.

In some exemplary embodiments, an error in any previous block will halt execution of the whole pipeline, thus allowing any other blocks that are running to complete naturally. However, in other exemplary embodiments, this can be a user policy decision, allowing the evaluation of blocks whose preconditions have been satisfied to continue.

Figure 3:
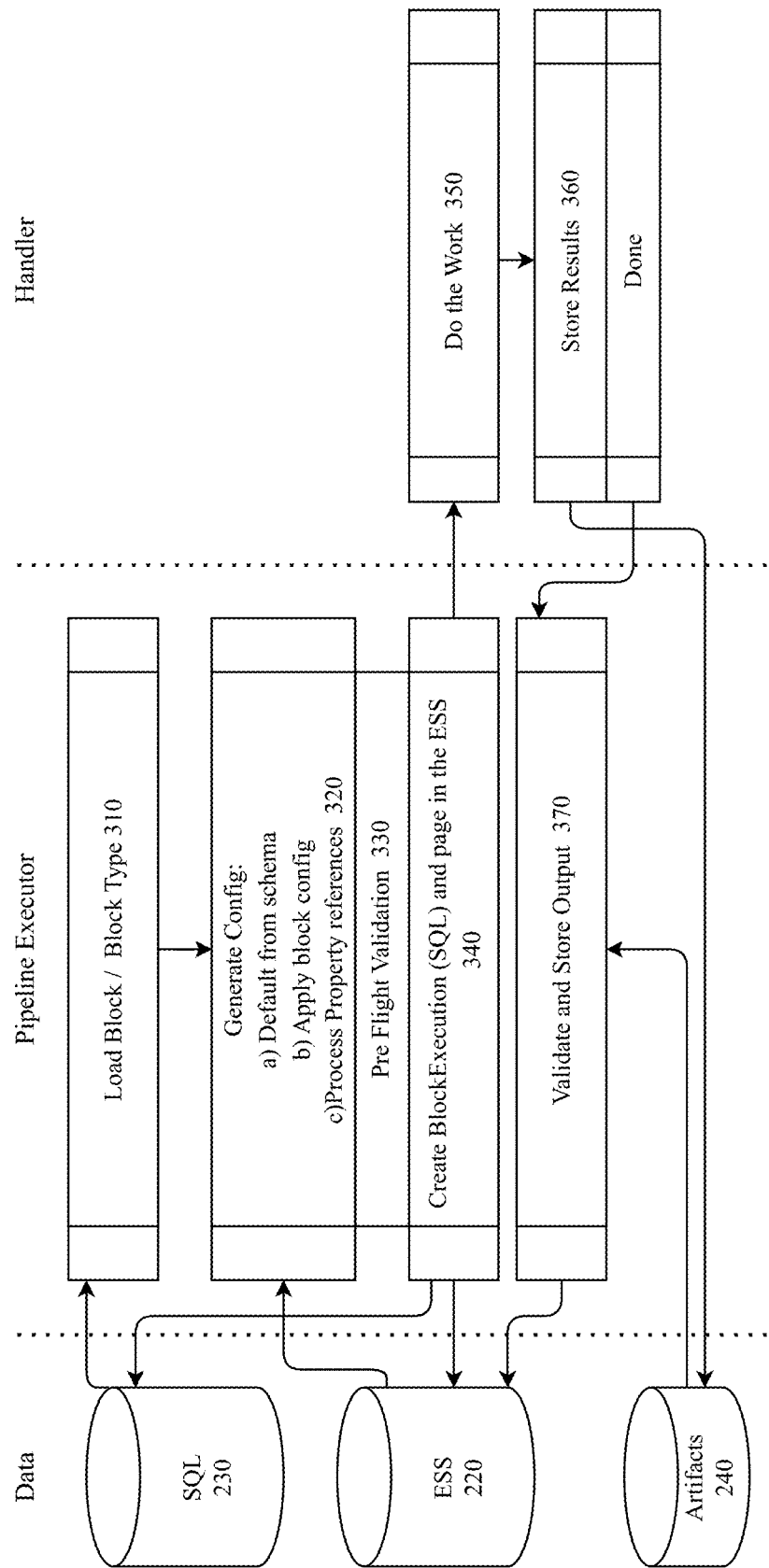
FIG. 3 illustrates a process of the block lifecycle within the Pipeline according to various exemplary embodiments.

FIG. 3 illustrates a process of the block lifecycle 300 within the pipeline according to various exemplary embodiments. Specifically, the block and its underlying block type are loaded 310 from the SQL database 230. The block's configuration is then built 320. According to some exemplary embodiments, this building includes seeding default values from the block type's schema, applying block configurations that overwrite any default values and performing data binding to turn any property references into values.

Pre-validation 330 may occur to ensure that the block can run. This process entails ensuring that required values, as defined in the block type's schema, are present. Types may be checked by the pipeline executor at this time. The types are typically only used at this time in the MVP solution for the UI to assist with data binding and entry.

In some exemplary embodiments, a universally unique identifier (UUID) may be generated for the block's execution and any appropriate information or operations may be performed in the ESS 220 for the block's results. A new block execution (340) is then created in the SQL database 230, indicating that the block is about to run. The handler corresponding to the block is then invoked asynchronously and the handler then executes (35) and resolves after ensuring that it generates all appropriate outputs (360).

The pipeline executor loads the outputs, stores them in the ESS 220, then validates them against the block type's schema (370). The block execution in the SQL database 230 is then updated to indicate the block has finished.

According to some exemplary embodiments, there may be statelessness in individual pipeline steps. Though the overall pipeline is stateful, the state may be tracked independently in a non-SQL data store, which allows any worker process of the pipeline executor to evaluate an individual block. In some exemplary embodiments, the entire activity is intended to take place in a single regional deployment. However, in alternate embodiments, it may be desirable to allow the pipeline to run across multiple regions.

To facilitate this process, the command to run a block in a pipeline can be dispatched via a pipeline stream (e.g., Kafka, or any other adequate framework), even in scenarios where the current instance of the pipeline executor is expected to fully handle the request. This also allows a block that was aborted in a new instance of the pipeline executor to be automatically retried.

As described above, one of the functionalities that makes the exemplary pipeline manager a value proposition for the user is the ability to utilize the results of previous blocks as inputs to other blocks. In some exemplary embodiments, this is accomplished by property references, which can appear in any block input and reference either a global configuration, also known as a pipeline configuration, or in the execution state, which contains the output of previous blocks.

Figure 4:
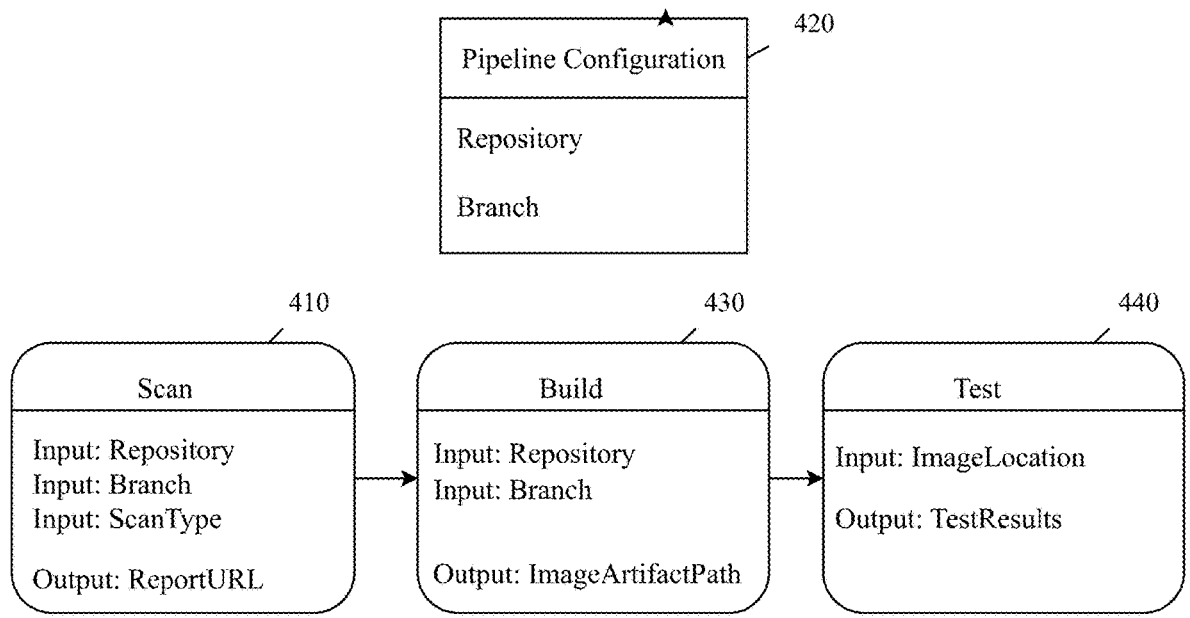
FIG. 4 shows an example of the wiring between blocks, illustrating a simple exemplary Pipeline with inputs, outputs and global configuration values defined according to various exemplary embodiments

FIG. 4 shows an example of the wiring between blocks, illustrating a simple exemplary pipeline 400 with inputs, outputs and global configuration values defined according to various exemplary embodiments. FIG. 4 also illustrates how configurations and previous outputs can be used to tie pipelines together and create the desired outcomes.

In one exemplary scenario, inputs 410 may be intended to be supplied by block configuration, for instance, by user input (e.g., Scan.ScanType). The input (e.g., Scan.ScanType) and the type of form field displayed would depend on the type of the input. For instance, the type of form field displayed may include, but is not limited to, a freeform string, an enumeration selected from a drop-down list, etc. In a similar exemplary scenario, outputs may be intended for use by the user or by the UI (e.g., Scan.ReportURL, Test.TestResults).

In another exemplary scenario, inputs 420 are meant to be supplied by pipeline configuration. For example, the Global Configuration element Repository is meant to be linked to the input Scan.Repository, as well as with the GLOBAL.Branch ->Scan.Branch, and with similar inputs on the Build block).

Any input value in a pipeline can include, or wholly comprise of, a merge tag or series of merge tags which reference previous outputs and global configuration values. For example, the value of the input Scan.Repository may be:

{{GLOBAL.repository}}

The pipeline manager UI may create the property references for standard pipelines. Pipeline configuration values may be objects themselves, allowing for fully dereferenced property references. Thus, with a slightly different pipeline configuration, the value of the repository input for scan 410 and build 430 may be:

{{GLOBAL.git.repository}}

Then, in an embodiment, the image output path generated by the build 430 may be linked to the image path input required by the test block 440. In this embodiment the property reference may be:

{{BLOCKS.build.imageArtifactPath}}

Other similar exemplary scenarios include, but are not limited to, inputs which are supplied by the results of previous blocks' evaluation (e.g., Test.ImageLocation) and outputs which can be used either by the UI or by subsequent blocks (e.g., Build.ImageArtifactPath). Notably, there is no distinction between these different types of input and output within the block, block type or schema. A user is always allowed to supply a value which can be supplied by another block's output, and another block's output can always be bound to an input, assuming the types of the respective input and output allow this.

Figure 5:
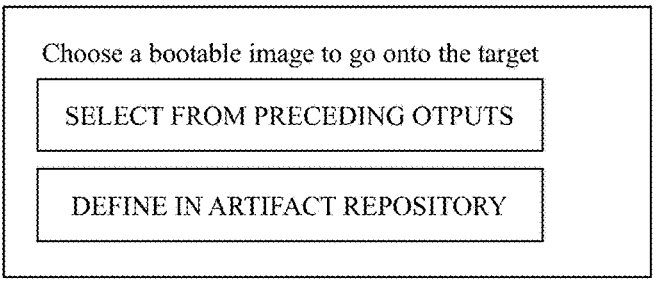
FIG. 5 shows an example of a selector dialog to help the user choose between previous outputs which can be used according to various exemplary embodiments.

FIG. 5 shows an example of a selector dialog 500 to help the user choose between previous outputs which can be used according to various exemplary embodiments. The pipeline definition contains all the necessary information for the pipeline manager UI to determine: (a) if any of the outputs of previous blocks can satisfy input requirements and (b) which output(s) those are. This allows for the block configuration UI to show a button if there are previous outputs which can be used, and then a selector dialog to help the user choose between them, as shown in the exemplary embodiment in FIG. 5.

Property references may also appear as part of a string property value. For example, to generate a URL with the ID created by a previous block, it would be desirable to set the value of the input to something like this: https://somewebsite.com/results/{{BLOCKS.someStep.resultId}}/details.html Property references interpolated in this way may be value-typed, and objects may not be used in this fashion. However, when the whole value of the input is a property reference, as in the above examples, the property in question can be a value or object type.

Figure 6:
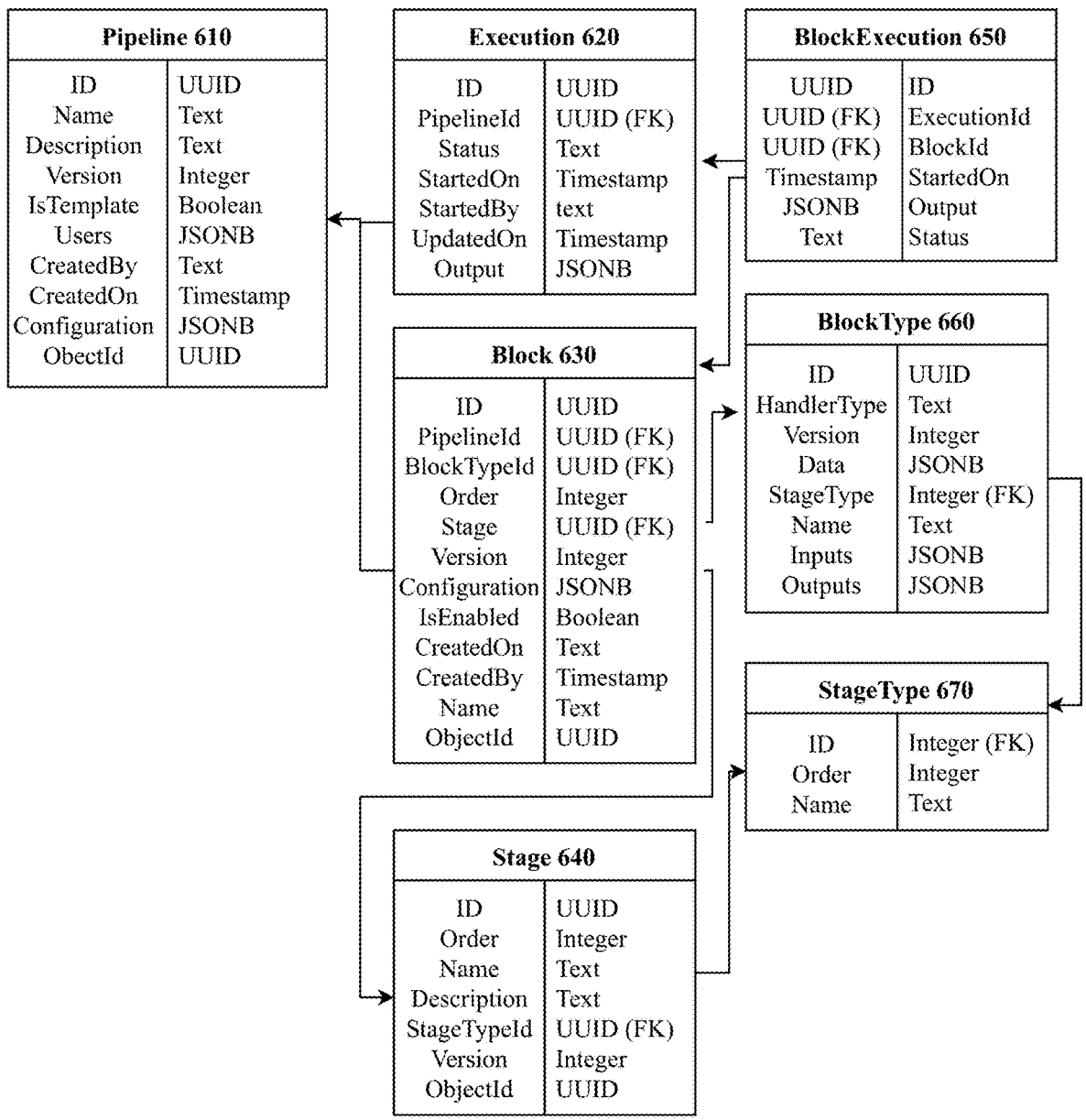
FIG. 6 shows an exemplary data model that represents the pipeline definition, including the necessary definitions for the block types which go into creating the pipeline according to various exemplary embodiments.

FIG. 6 shows an exemplary data model 600 that represents a pipeline definition 610, including the necessary definitions for the block types which go into creating the pipeline according to various exemplary embodiments. The exemplary data model 600 includes pipeline data 610, execution data 620, block data 630, stage data 640, block execution data 650, block type data 660 and stage type data 670. The following description provides some examples of the data in the data model 600 and is not intended to include all the possible data that may be used in the data model to define a pipeline.

For example, the execution's 620 "Status" field may include, but is not limited to, one of the following statuses: Started, Running, Completed, Error, Cancelled, Hung. Versioning may be done in place, with all versions existing in the database. Each time a change is made to a versioned object in the schema a new row may be created that auto-increments the version number. Any downstream links are copied for the new version of the pipeline. The ObjectId, which is present on the pipeline 610 and block 630, represents an external ID that can remain consistent across versions of the resource.column This approach may maximize database storage space, but it also maximizes historical accuracy, including links to specific versions of blocks in specific versions of pipelines, etc. This allows maximum flexibility in terms of how reversions work, e.g., a pipeline can be reverted fully to talk to the same versions of the blocks it was addressing at the time it was versioned, or only the pipeline could be reverted, linking it instead to the newest versions of the blocks in question.

In some exemplary embodiments, the history may be stored separately from the main tables, either by creating a shadow set of history tables with the same structure as the mainline tables, or even using a whole secondary data store.

Most of the JSON-typed fields in the object model indeed represent arbitrary objects, such as configuration on pipeline 610 and block and input/output on BlockType 660. The latter two combine to create what is referred to as the block type's "schema". These objects may be any valid JSON object. For instance, the pipeline configuration becomes the GLOBAL namespace of the property references. The object has no validation, required fields or imposed structure. Additionally, an Execution 620 output represents the final output the pipeline 610, or in other words, the final execution state of the pipeline 610. Further, a BlockExecution's 650 output is the total output for that block (which is also available in the Execution's 620 output field). This information may also be available in the ESS but is included here for simplicity in the UI. Moreover, a Block's 630 configuration stores the user-entered and pipeline-manager generated values for the inputs of that block. This can include static values and property references as explained earlier. Further, a Block Type's 660 data property stores a set of values defined by the block type which are passed into the handler. This is useful for generic block types that take in certain, known values.

Figure 7:
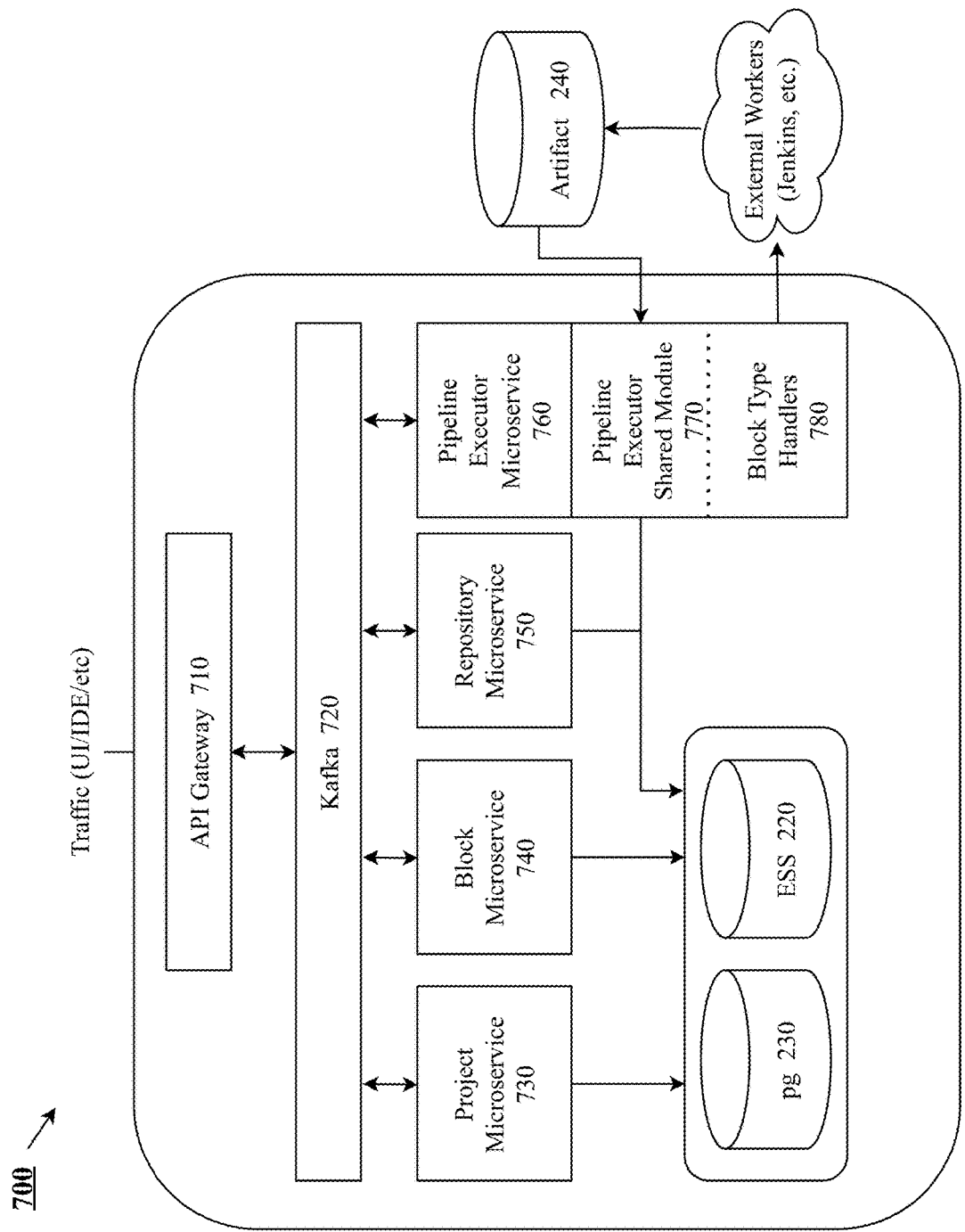
FIG. 7 illustrates an architectural overview of the Pipeline Manager web stack according to various exemplary embodiments.

FIG. 7 illustrates an architectural overview of the pipeline manager web stack 700 according to various exemplary embodiments. The pipeline manager web stack 700 includes an API gateway 710, a pipeline stream (e.g., Kafka 720) and various microservices 730-760. The project microservice 730 and repository microservice are standard microservices and will not be described in further detail.

The block microservice 740 may interact with the databases (e.g., the ESS 220 and the SQL database 230) to perform create, read, update and delete (CRUD) operations on pipelines and blocks, as well as their status. The block microservice 740 is the main service that the pipeline manager builder in the UI will interact with while building and editing pipelines. The block microservice 740 may be a Representational State Transfer (REST) service atop the database tables.

The pipeline executor microservice (PEMS) 760 functions as a wrapper around the pipeline executor shared module 770, which provides the functionality of the pipeline manager. The PEMS 760 will expose an endpoint to start a new run, as well as one to check the status of a run and to get the output of a successful run. The shared module 770 contains the known set of handlers which map to block type handlers 780 in the data model. The output handoff using artifacts 240 is once again illustrated in FIG. 7.

Those skilled in the art will understand that the above-described exemplary embodiments provide several advantages over existing technology. For instance, the blocks are flexible, and can represent implementations of shared functionality (e.g., run a Jenkins job) or discrete implementations (e.g., integrate with this third party tool for a single block type). Further, blocks can be fully defined by a markup language (e.g., YAML), with the caveat that the handlers may be written in a Java script (e.g., TypeScript). This allows multiple teams within a single organization and even external teams outside of the organization to define their own block types. Additionally, handlers may be fully atomic and functional and do not need to know about the pipelines, databases, or anything other than the defined inputs, the work, and the defined outputs. Thus, the data can be used at least to: (a) perform pre- and post-execution validations to determine if a block can run, and if a block has run successfully; (b) determine which output(s), if any, from previous blocks can satisfy input requirements for current ones; (c) determine when a block can run in an asynchronous environment (via stages and whether prerequisites are available); (d) suggest "automatic wiring" for pipelines; and (e) identify missing inputs and dependencies based on changes to the pipeline. Further, each step in the pipeline has its inputs, outputs, logs and status fully captured, so that pipelines may be replayed in this fashion, and individual blocks can be debugged and monitored. Additionally, wiring using property references allows for pipelines to run in a variety of ways. For example, users can disable previous steps and replace wired-up inputs with static values, or disable blocks, see which dependencies are broken and then replace them with newly added blocks. Another advantage is that blocks, block types and pipelines are all signed, or in other words, versioned. Thus, all the metadata, state, configuration and transient values generated by the pipeline executor are retained.

Those skilled in the art will understand that the above-described exemplary embodiments may be implemented in any suitable software or hardware configuration or combination thereof. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A method, comprising:
receiving, via a user interface (UI), a representation of a pipeline comprising a plurality of blocks, wherein each block comprises a defined input and a defined output;
executing each block of the pipeline;
validating output of each block of the pipeline based on the execution of the block;
storing the output of each block and updating data that defines the pipeline based on the output of each block; and
generating a wiring from a first one of the blocks to a second one of the blocks, wherein the wiring indicates a first output of the first one of the blocks is a first input to the second one of the blocks and wherein the wiring is based on a property reference comprising a value of a current execution state of the pipeline.

2. The method of claim 1, wherein the plurality of blocks include at least two serial blocks, wherein the output of a first serial block is the input for a second serial block.

3. The method of claim 1, wherein the plurality of blocks include at least two parallel blocks, wherein the execution of the at least two parallel blocks are performed simultaneously.

4. The method of claim 1, wherein each block comprises a block type comprising a block type handler, a schema, and a block type stage.

5. The method of claim 4, wherein the block type handler corresponds to a handler that is used to run the block.

6. The method of claim 4, wherein the schema refers to objects that include the defined input and a defined output of the block.

7. The method of claim 4, wherein the pipeline comprises a plurality of stages and wherein the block type stage defines one or more of the plurality of stages for which the block is used.

8. The method of claim 1, further comprising:
signing one or more of the blocks or the pipeline when a change is made to the one or more of the blocks or the pipeline; and
storing the outputs of the execution with the signature for the one or more of the blocks or the pipeline.

9. The method of claim 1, further comprising:
receiving, via the UI, one of a change to one of the plurality of blocks or a new block in the pipeline; and
executing the blocks in the pipeline, wherein the execution comprises only executing the blocks where the change was made or the new block that was added.

10. The method of claim 1, wherein the pipeline includes one of a user based permission defining users allowed to access the pipeline or a role based permission defining assigned roles of users allowed to access the pipeline.

11. The method of claim 10, wherein the access comprises multiple levels of access and wherein each user based permission or role based permission is granted access to one or more of the multiple levels of access.

12. The method of claim 1, wherein each of the plurality of blocks includes one of a user based permission defining users allowed to access the block or a role based permission defining assigned roles of users allowed to access the block.

13. The method of claim 1, wherein the output of one of the blocks is configured to be shared with a block of another pipeline when (i) a block sequence of the one of the blocks and a block sequence of the block of the another pipeline are the same and (ii) a permission level of the pipeline and the another pipeline are compatible.

14. The method of claim 1, further comprising:
generating, when the execution of the pipeline is complete, a pipeline execute birth certificate comprising a signature and a time stamp.

15. A non-transitory computer readable storage medium comprising a set of instructions configured to be executed by a processor, wherein the set of instructions cause the processor to perform operations, comprising:
receiving, via a user interface (UI), a representation of a pipeline comprising a plurality of blocks, wherein each block comprises a defined input and a defined output;
executing each block of the pipeline;
validating output of each block of the pipeline based on the execution of the block;
storing the output of each block and updating data that defines the pipeline based on the output of each block; and
generating a wiring from a first one of the blocks to a second one of the blocks, wherein the wiring indicates a first output of the first one of the blocks is a first input to the second one of the blocks and wherein the wiring is based on a property reference comprising a value of a current execution state of the pipeline.

16. The computer readable storage medium of claim 15, wherein each block comprises a block type comprising a block type handler, a schema, and a block type stage.

17. The computer readable storage medium of claim 15, wherein the operations further comprise:
signing one or more of the blocks or the pipeline when a change is made to the one or more of the blocks or the pipeline; and
storing the outputs of the execution with the signature for the one or more of the blocks or the pipeline.

18. The method of claim 1, wherein generating the wiring is performed automatically without input from a user.

19. The method of claim 1, further comprising:
modifying the pipeline; and
identifying missing input for one or more blocks or missing dependencies for one or more blocks based on modifications to the pipeline.

20. The method of claim 1, further comprising:
disabling the first one of the blocks;
replacing the value of the current execution state of the pipeline with a static value; and determining dependencies between blocks based on the first one of the blocks being disables and the static value.

\* \* \* \* \*